United States Patent [19]

Austin

[11] Patent Number: 5,183,700
[45] Date of Patent: Feb. 2, 1993

[54] SOLAR CONTROL PROPERTIES IN LOW EMISSIVITY COATINGS

[75] Inventor: R. Russell Austin, Novato, Calif.

[73] Assignee: Viratec Thin Films, Inc., Faribault, Minn.

[21] Appl. No.: 565,941

[22] Filed: Aug. 10, 1990

[51] Int. Cl.$^5$ ............................................. B32B 17/06
[52] U.S. Cl. ..................... 428/216; 359/359; 359/360; 359/580; 359/589; 428/432; 428/472; 428/698; 428/701; 428/913
[58] Field of Search ............... 428/336, 469, 472, 426, 428/432, 913, 698, 216, 701, 702; 359/359, 360, 580, 586, 588, 589

[56] References Cited

U.S. PATENT DOCUMENTS

| | | | |
|---|---|---|---|
| 2,519,722 | 8/1950 | Turner | 359/584 |
| 3,649,359 | 3/1972 | Apfel et al. | 350/164 |
| 3,761,160 | 9/1973 | Apfel et al. | 350/164 |
| 3,885,855 | 5/1975 | Gross | 428/427 |
| 4,450,201 | 5/1984 | Brill et al. | 428/336 |
| 4,534,841 | 8/1985 | Hartig et al. | 428/426 |
| 4,799,745 | 1/1989 | Meyer et al. | 350/204 |

FOREIGN PATENT DOCUMENTS 0183052 6/1986 European Pat. Off. .
63-206333 8/1988 Japan .

OTHER PUBLICATIONS

Valkonen et al. "Optical constants of thin silver and titanium nitride films" SPIE vol. 652 Thinfilm Tech. II (1986).

P. H. Berning and A. F. Turner, "Induced Transmission in Absorbing Films Applied to Band Pass Filter Design," J. Opt. Soc. Am., vol. 47, No. 3, pp. 230–239 (1957).

*Thin Film Optical Filters* by MacLeod, Chap. 7, pp. 292–311, 2nd ed (1986).

P. H. Lissberger, "Coatings with induced transmission", Appl. Opt., vol. 20, No. 1, pp. 95–104 (1981).

MacLeod, "A new approach to the design of metal-dielectric thin-film optical coatings," Optica Acta, 1978, vol. 25, No. 2, pp. 93–106.

Von J. Szczyrbowski, et al., Optical and electrical properties of thin TiN layers, Vakuum-Technik, 37 Jahrgang, Heft Jan. 1988.

*Primary Examiner*—Ellis P. Robinson
*Assistant Examiner*—Archene Turner
*Attorney, Agent, or Firm*—Heller, Ehrman, White & McAuliffe

[57] ABSTRACT

A coating or multilayer structure for a substrate. The coating comprises an induced transmission filter coupled to a short wavelength pass filter.

8 Claims, 12 Drawing Sheets

SOLAR CONTROL PROPERTIES IN LOW EMISSIVITY COATINGS

BACKGROUND OF THE INVENTION

1. Field of the Invention

The present invention relates generally to thin film, multilayer coatings, and more particularly to low emissivity coatings.

An "induced transmission filter" employs a single film of silver bounded by dielectric multilayer stacks of alternating high and low index materials. See P. H. Berning and A. F. Turner, "Induced Transmission in Absorbing Films Applied to Band Pass Filter Design", J. Opt. Soc. Am., Vol. 47, No. 3, pp. 230-9 (1957). This filter was originally conceived as a means of making narrow band interference filters with extended blocking regions due to the metal reflectivity. Transmission is "induced" through the metal film in a narrow range by the antireflection coating effect of the dielectric layers.

The now widely-used low emissivity (E) coatings are simply an induced transmission filter with a wide bandpass region, i.e., the entire visible spectrum. The structure used to achieve this result has a very thin silver film approximately three times thinner than the original Berning and Turner narrow band designs. As such, it requires only a single layer of dielectric material, preferably a high refractive index material such as titanium oxide or zinc oxide.

Low E coatings are used, for example, to reduce heat loss caused by radiation through the outside windows of buildings. This is accomplished by designing the coatings to provide high reflectivity for longer wavelength infrared radiation, typically a wavelength of about 10 micrometers. The coatings are also designed to provide high transmission but low reflection for visible radiation (light). It is also desirable that the color of the transmitted visible light not be affected by the coating. Typical performance values for such coatings are: a reflection for infrared radiation greater than about 90 percent, a transmission for visible radiation greater than about 75 percent, and a reflection for visible radiation of about 4 percent.

In warmer climates, it is also important to reduce the heat input into a building through its outside windows. The total heat input through the windows is apportioned in the electromagnetic spectrum of radiation as follows: less than about 5 percent is at wavelengths less than 425 nanometers (nm), i.e., in the ultraviolet region of the spectrum; about 40 percent is at wavelengths between 425 nm and 675 nm, i.e., the visible region of the spectrum; and about 45 percent is between wavelengths of 675 and 1200 nm, generally referred to as the near infrared (NIR) spectral region.

In low E coatings for use in warm climates, it is desirable to suppress light in the NIR region, preferably by reflection and without affecting the visible light transmission properties. Suppression of visible light transmission, of course, also reduces solar heat input and is sometimes used to this end. The compromise between heat and visible light transmission reduction is usually determined by aesthetic and other energy considerations, such as an increase in the illumination costs resulting from a reduction in visible light input.

2. Description of the Related Art Layer Systems with One Metal Film

The basic low E structure is a three layer system. It is shown schematically in FIG. 1. The structure 20 comprises a layer of transparent dielectric material 22 in contact with a glass, for example, substrate 24. A layer of metal 26, which is highly reflective at infrared wavelengths but thin enough to be partially transparent to visible radiation, is disposed between dielectric layer 22 and another transparent dielectric layer 28.

Figure 1:
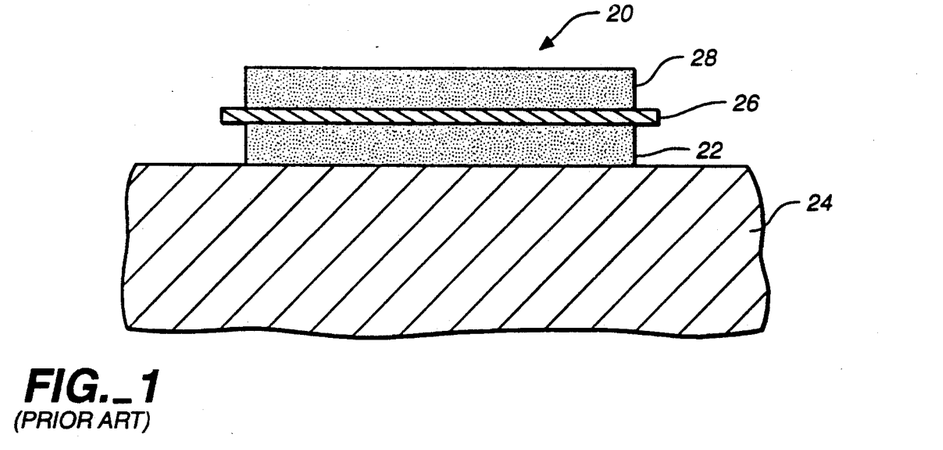
FIG. 1 schematically illustrates a three layer low E structure.

The metal layer 26 may be silver with a thickness about 10 nm. The dielectric layers 22 and 28 are typically zinc oxide, titanium oxide, or tin oxide. The dielectric layers may have a refractive index greater than about 1.9. The optical thickness of the dielectric layers may be about one-quarter of wavelength at a wavelength of 520 nm, i.e., in the middle of the visible spectrum. The dielectric films or layers reduce the reflection of visible light from the metal film, and thus increase the transmission of visible light through the structure.

Figure 2:
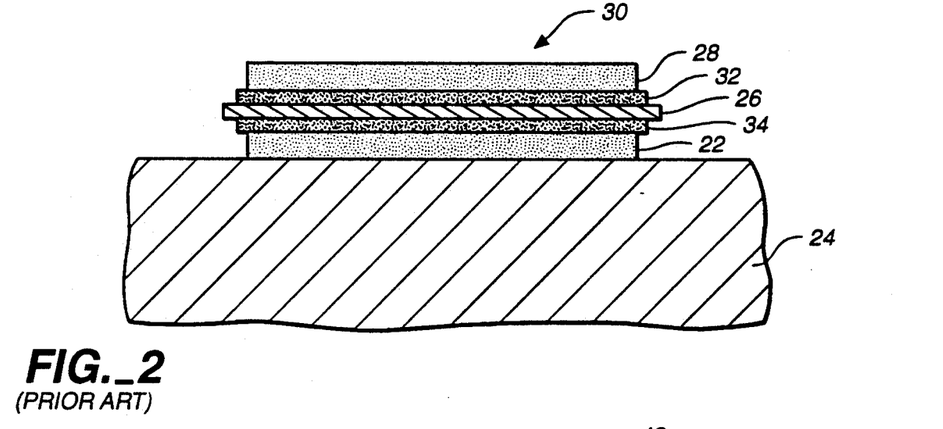
FIG. 2 schematically illustrates the use of barrier layers in a low E structure.

In other structures, such as structure 30 of FIG. 2, it is not unusual to use much thinner dielectric layers 32, 34. Layers 32, 34 may be about 10 nm thick and are disposed on opposite sides of metal layer 26. The additional dielectric layers 32, 34 promote adhesion of the thicker dielectric layers 22 and 28, and/or prevent oxidation of metal film 26 during the deposition of dielectric layers 22, 28. The thin layers 32, 34 are referred to as barrier layers or adhesion layers. They are sufficiently thin so that they do not interfere with the passage of visible radiation. The optical principle of structure 30, a five film structure, is identical to that of three layer structure 20.

European patent application Serial No. 85113488.2, Publication No. 0 183 052, published Jun. 4, 1986, discloses the advantages of binder layers for solar control coatings with one metallic layer. This application also discloses the use of an alloy target to increase sputtering rates without a sacrifice in durability. The binder layers are added to prevent oxidation of the metallic layer. The binder layers improve the adhesion between the metallic and metal oxide layers. The binder layers are metal films which themselves become oxidized by the subsequent process steps. These oxidized binder layers then become part of the dielectric films surrounding the metallic layer. They are sufficiently thin so that they make no significant contribution to the interference design other than being part of the dielectric film. The optical system is simply: a dielectric/metal/dielectric (DMD) induced transmission filter.

Figure 3:
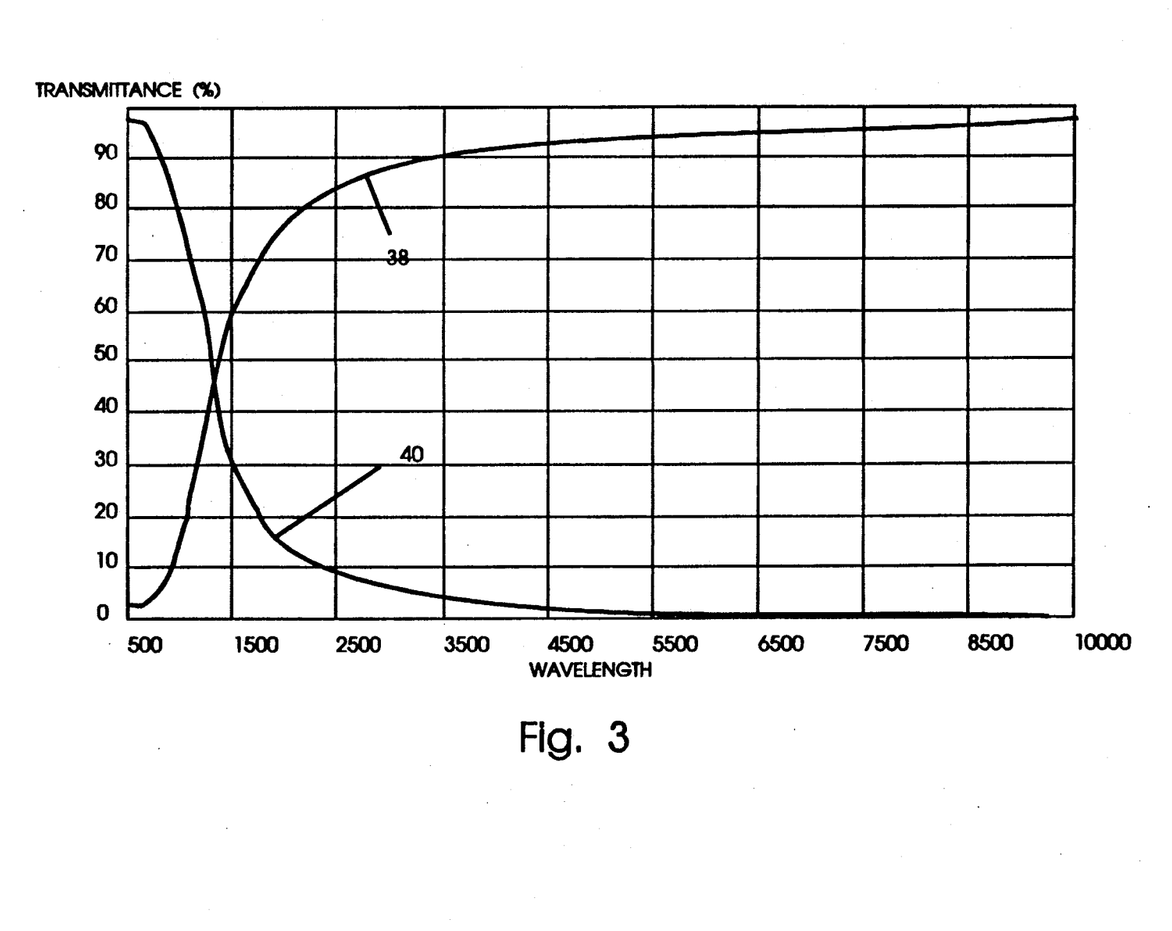
FIGS. 3 and 4 are graphs illustrating the spectral performance of a three layer, silver-based low E structure.
Figure 4:
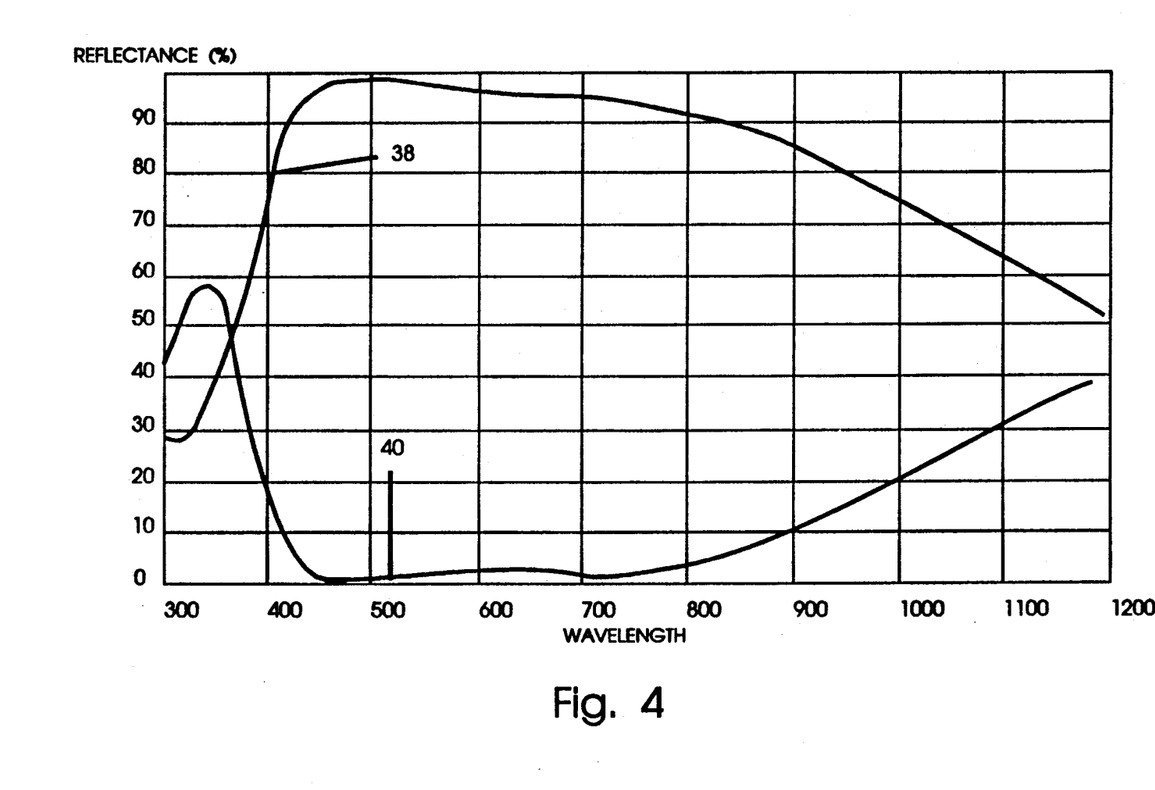

The spectral performance of a silver film low E system was computed and is shown in FIGS. 3 and 4. The dielectric layers 22 and 28 were considered to be titanium oxide ($TiO_2$) having thickness of 43.5 and 37 nm, respectively. The thickness of the silver metal layer was selected to be 10 nm. The performance in the visible and NIR regions is shown more clearly in FIG. 4. It can be seen that the system fulfills the requirement for IR reflection and high visible transmission (curve 38), but does not significantly reduce transmission (curve 40) in the NIR region of the spectrum.

Layer Systems with Two Metal Films

The induced transmission filter principle can be extended to include layer systems that have two or more metal films. In the simplest form, in which they would be used for low emissivity or solar control coatings, such systems would comprise five optically functional layers as follows: dielectric/metal/dielectric/metal/dielectric (DMDMD). Some other layers may be included for adhesion or barrier purposes as already discussed. Some general references on the optical principles are discussed for a number of metal dielectric systems in *Thin Film Optical Filters* by MacLeod, Chap. 7, pp. 292-311, 2d ed. (1986). See also: P. H. Lissberger, "Coatings with induced transmission", Appl. Opt. Vol. 20, No. 1, pp. 95-104 (1981).

Figure 5:
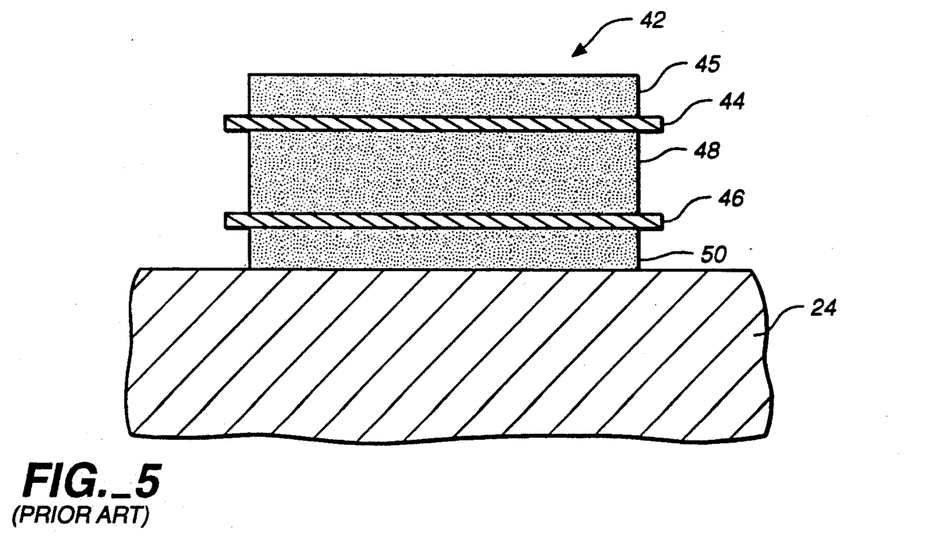
FIG. 5 schematically illustrates a low E structure having two metal layers.

For instance, the structure 42 of FIG. 5 is designed to provide attenuation of the NIR wavelengths. It includes two metal layer 44, 46 separated by a transparent dielectric layer 48. Additionally, transparent dielectric films 45 and 50 are located on the outer surfaces of metal layer 44 and 46. As shown, such a structure has a minimum of five layers.

The metal layers 44, 46 may have a thickness of about 10 nm, and the dielectric layer 48 separating the metal layers may have an optical thickness of about one-half wavelength at a wavelength of 520 nm. The outer dielectric layers 45, 50 may have an optical thickness of about one-quarter wavelength at 520 nm. The materials used may be similar to those used in the three layer system of FIG. 1. Additional thinner layers may be employed as barrier or adhesion layers as described above.

Figure 6:
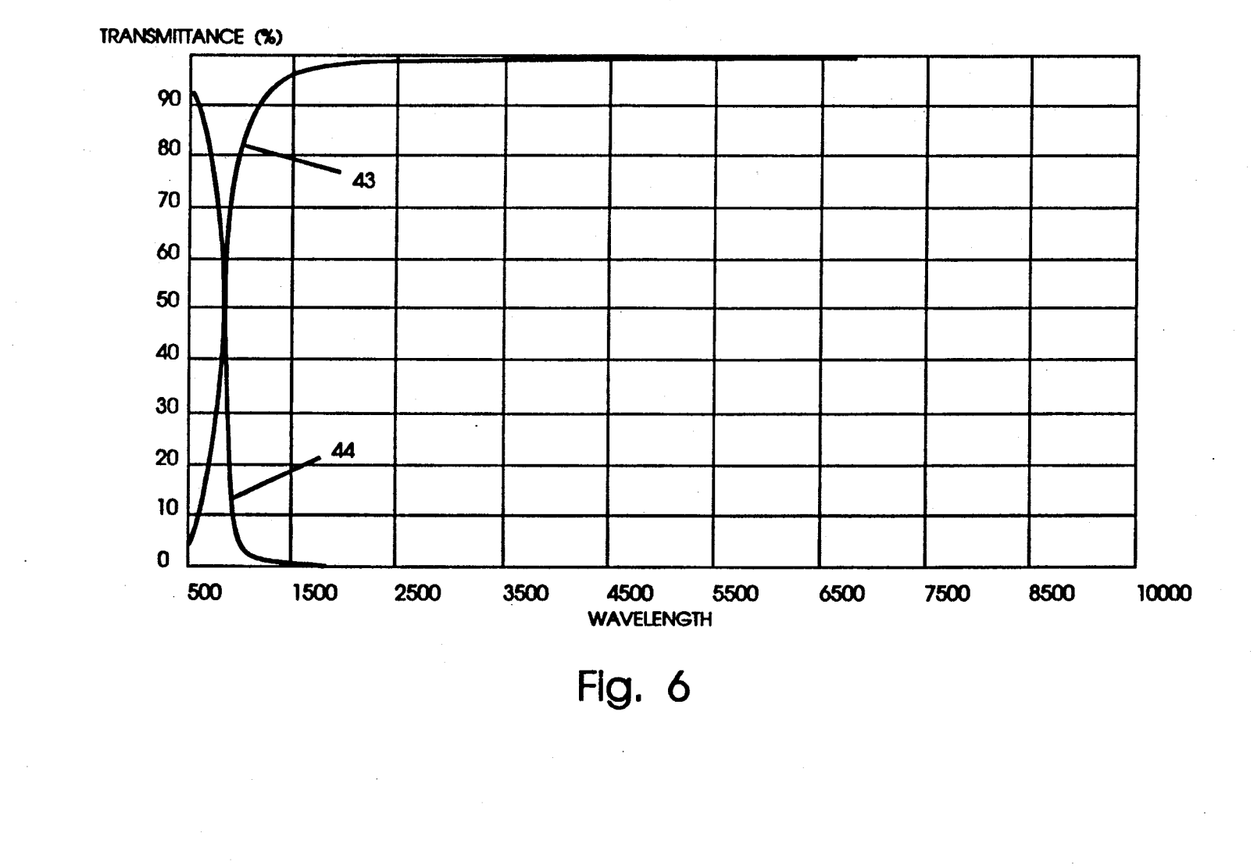
FIGS. 6 and 7 are graphs illustrating the spectral performance of the structure of FIG. 5.
Figure 7:
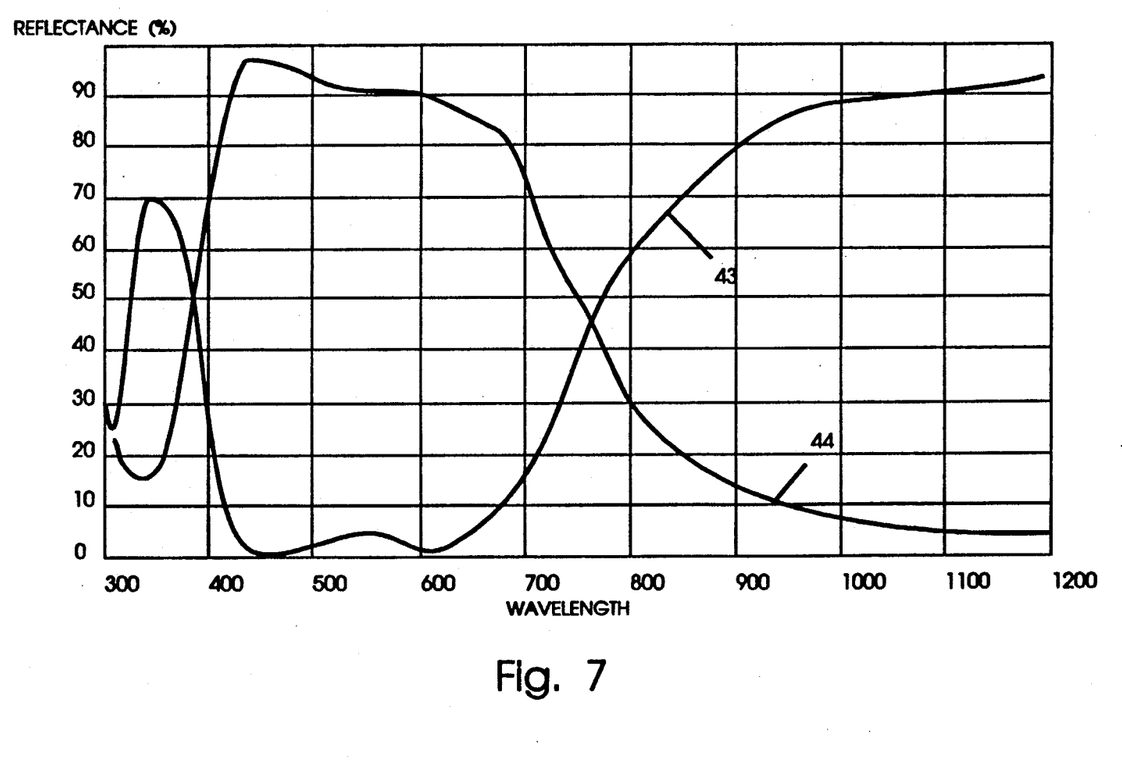

The spectral performance of structure 42 has been computed and is shown in FIG. 6. The performance in the visible and NIR spectral regions is shown in FIG. 7. The dielectric layers 45, 48 and 50 were considered to be $TiO_2$ having thickness of 32 nm, 65 nm and 31.2 nm, respectively. The metal layers 44 and 46 were considered to be silver each having a thickness of about 150 nm. As can be seen from FIGS. 6 and 7, the structure is quite effective in suppressing the NIR wavelengths (curve 43) without significantly reducing transmission of visible wavelengths (curve 44).

In U.S. Pat. No. 4,799,745, silver or a silver-gold alloy is utilized as the metal of preference. A symmetrical system is disclosed as an example and, although not specifically stated, it is implicit that the two metal films are of the same metal. It is also stated that the layers need not be the same thickness, and indeed in this five layer system, the metal layer thicknesses can be adjusted to give a lower reflection on one surface.

Characteristics of the Five Layer, Two Metal Layer System

Figure 8:
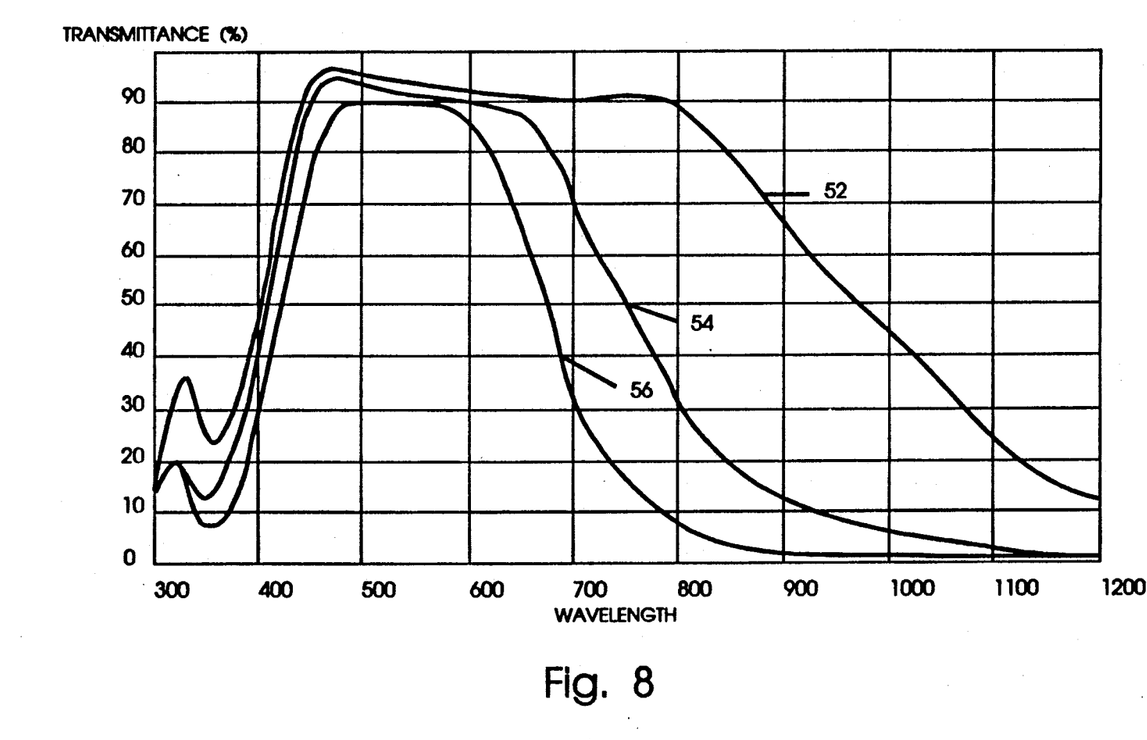
FIG. 8 is a graph illustrating the spectral performance of a five layer, low E structure using silver layers of various thicknesses.

A distinctive characteristic of structures with two metal layers, such as structure 42, is that the NIR rejection properties are connected, by virtue of the design principle, with the transmission bandwidth in the visible region of the spectrum. To illustrate this, the performance of three different five layer systems (two metal layers) using silver layers of various thickness has been computed. The thickness of the silver layer was made the same for both layers, and those thicknesses were set at 10, 15 and 20 nm. The result is shown in FIG. 8 wherein curves 52, 54 and 56 represent the transmission bandwidth for the thickness of 10, 15 and 20 nm, respectively. The dielectric layers were assumed to be titanium dioxide. The thickness of layers 45 and 50 was considered to be about 35 nm, and the thickness of the center dielectric layer was about 70 nm. The designs were optimized to provide the lowest reflection in the visible spectral region.

The reduction in the spectral bandwidth accompanied by a reduction in the peak transmission value as the silver layers are made thicker is very clear. The bandwidth reduction for the structure using 20 nm thick silver layers is sufficiently restricted such that light transmitted through the window would appear greenish in color.

These examples are offered to illustrate the principle of this design. It is recognized that further refinements based on different compromises between reflection and transmission are possible. These could be effected by employing, for example, silver layers of unequal thickness, different dielectric materials, and/or different dielectric layer thicknesses. It is also possible to extend the design principle to create systems with three metal layers and four dielectric layers or, in general, with any number (n) metal layers and n+1 dielectric layers.

It is an object of the present invention to provide a solar control coating having only one metal film component but offering high rejection in the NIR region. It is a further object of the present invention to provide solar control coatings which are sufficiently durable to be deployed on exposed glass surfaces.

SUMMARY OF THE INVENTION

The present invention is directed to a coating for a substructure. The coating comprises an induced transmission filter coupled to a short wavelength pass filter. The present invention provides a high degree of attenuation of radiation in the NIR spectrum, high reflection for infrared radiation, and high transmission and low reflection for visible radiation.

DETAILED DESCRIPTION OF THE PREFERRED EMBODIMENTS

Figure 9:
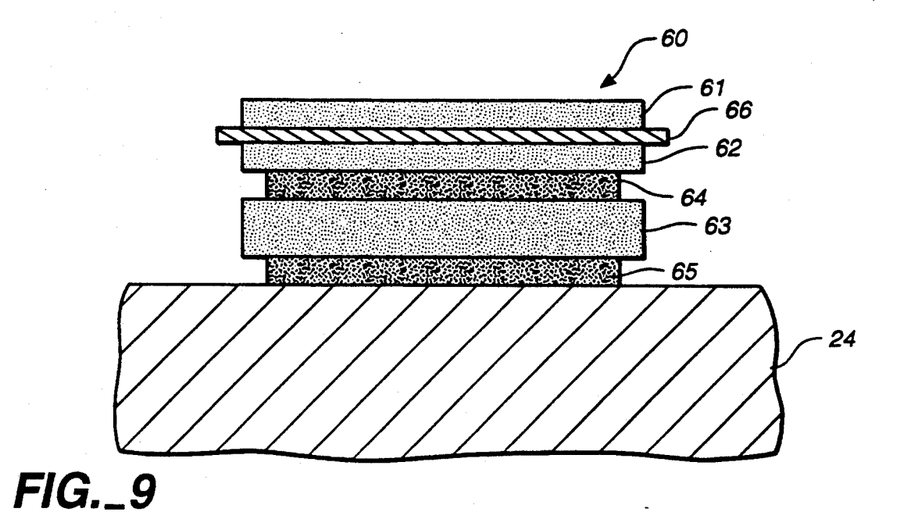
FIG. 9 schematically illustrates an embodiment of the present invention.

Referring now again to the drawings, wherein like reference numerals are used throughout the drawings to identify like components, reference is first made to FIG. 9. FIG. 9 shows a structure 60 in accordance with the present invention using six layers. Layers 61, 62 and 63 are dielectric layers each with a relatively high refractive index, for example, at least about 1.9. Layers 64 and 65 are dielectric layers with a relatively low refractive index, for example, about 1.46. Layer 66 is a metal layer thin enough to be at least partially transparent to visible light but thick enough to be highly reflective to long wavelength infrared radiation.

The structure of the present invention improves on the performance of the simple low E structure shown in FIG. 1. The dielectric layers of structure 60 boost the reflectivity of metal layer 66 in the region about the wavelength at which the dielectric layers have an optical thickness of about one-quarter wavelength. The reflectivity increase is only effective over a relatively narrow wavelength region. This region is broader for a structure wherein the ratio of the high and low index values of the dielectric layers is high.

The technique of using dielectric multilayers to increase the reflectivity of metal film reflectors is described in U.S. Pat. No. 2,519,722. The patent describes a technique for increasing the reflectivity of copper films for use as very high reflectors for NIR radiation. No consideration is given to anything other than the reflectivity of the device.

In the present invention, the dielectric layers are configured to provide high transmission and low reflectivity on the short wavelength side of the region in which the reflectivity is boosted. The structure of the present invention is of the form:

Air D M D (L/2 H L/2)$^n$ Substrate where D M D (corresponding to layers 61, 66, 62) represent the basic low E structure having a metal and two dielectric films, and (L/2 H L/2)n (corresponding to layers 64, 63, 65) represents a short wavelength pass filter. The H and L layers represent high and low refractive index dielectric materials, respectively, having a quarter-wave optical thickness at a wavelength at the center of the spectral region over which the reflection is boosted. L/2 would be, of course, a low refractive index dielectric material having an eighth-wave thickness at this same wavelength. The integer n is known as the group repetition number and represents the number of times the structure in parentheses is repeated. It should be noted that when n is greater than one, the adjacent eighth-wave layers would be combined to form a single quarter-wave layer. The D layer represents a high refractive index dielectric material having a quarter-wave optical thickness at a wavelength in the center of the visible spectrum, i.e. at about 520 nm. In practice, this can be the same material as the H layer.

The rejection (reflection) and edge steepness of the structure are determined by the refractive index ratio between the high and low index values of L and H, and the group repetition number n. The structure on the short wavelength side of the band can be treated as a single layer of appropriate phase thickness with a refractive index which is approximately the mean of the high and low refractive index values. Typically the high and low index values might be 2.35 for titanium dioxide and 1.46 for fused silica. At visible wavelengths these values would yield an effective index for the structure of about 1.9.

Figure 10:
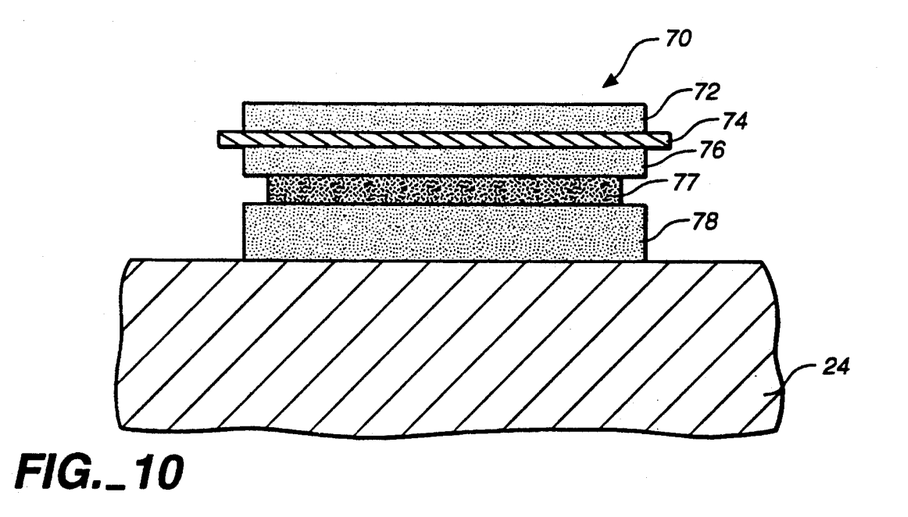
FIG. 10 illustrates another embodiment of the present invention having five layers.
Figure 11:
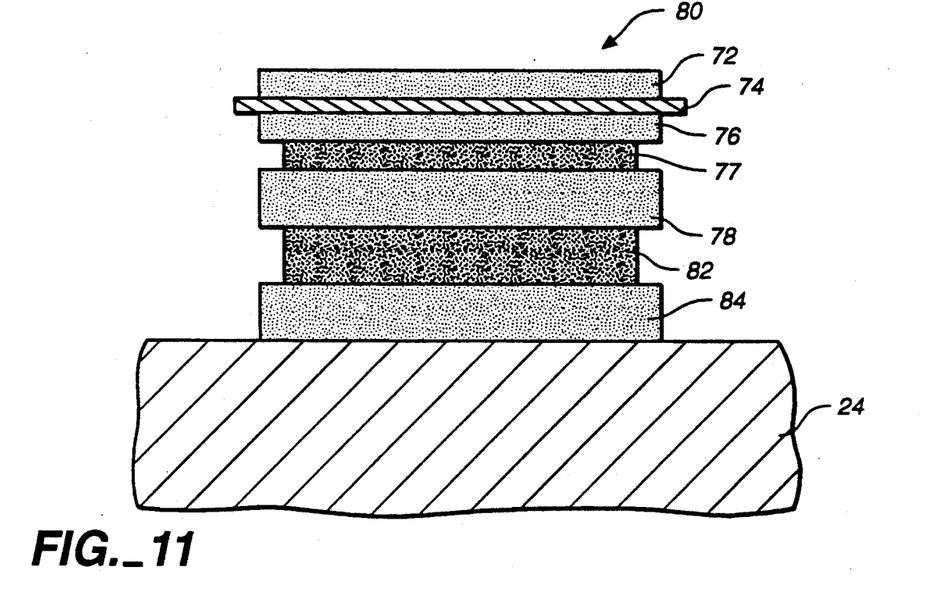
FIG. 11 schematically illustrates yet another embodiment of the present invention having seven layers.

In practice, it is possible to omit from the structure the eighth-wave layer 65 next to substrate 24 as the refractive index values of layer 65 and substrate 24 are sufficiently close. Under these circumstances and following some refinement of the individual thicknesses to optimize performance, the simplest structure becomes the five layer structure 70 shown in FIG. 10. Structure 70 includes layers 72, 74 and 76 corresponding to the low E structure D M D, and layers 77 and 78 form the two layer short wavelength pass filter. Higher NIR rejection can be obtained with the addition of one or more pairs of high and low index layers. An example of such a structure is the seven film structure 80 shown in FIG. 11 where layers 82 and 84 are the additional low and high refractive layers, respectively.

The performance of specific structures designed according to the principles of the present invention has been computed. The optical constants used in the computations were the generally-accepted values for the materials considered.

Figure 12:
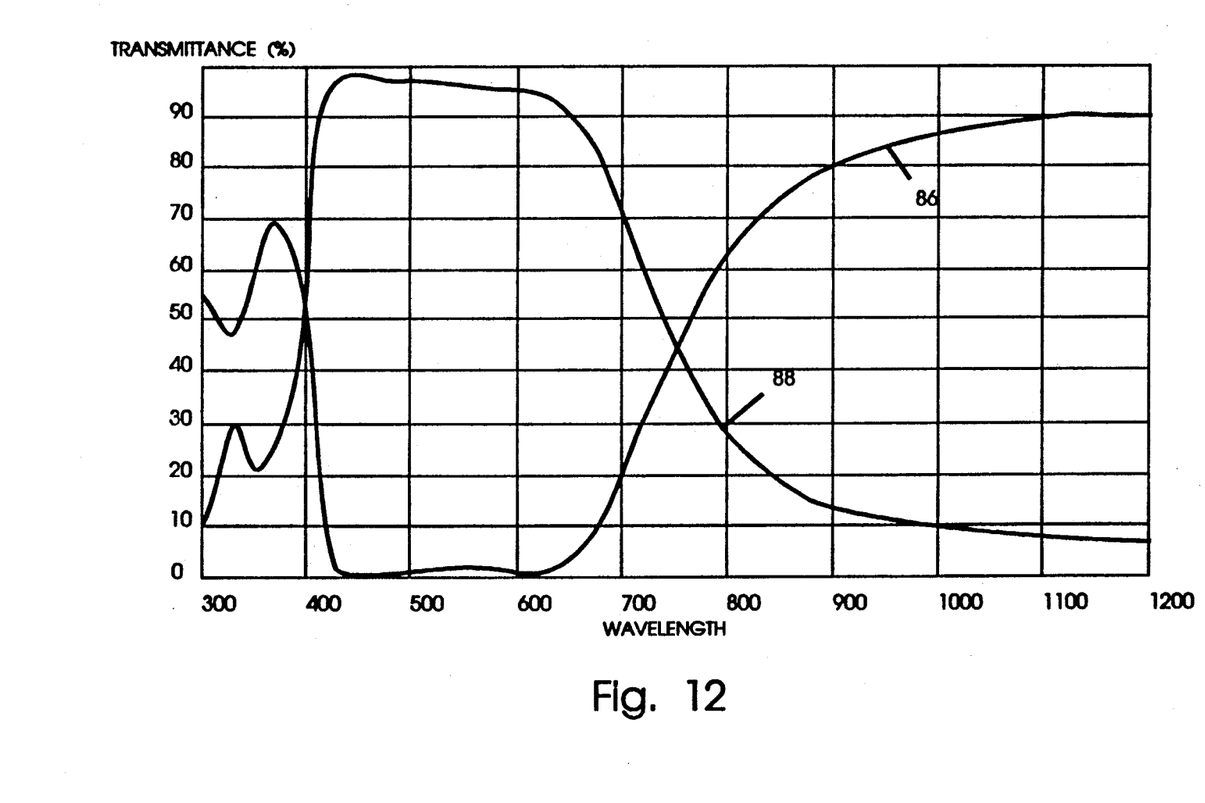
FIG. 12 is a graph illustrating the spectral performance of a five layer structure of the present invention.

The specific film thicknesses for a five layer structure using silver as the partially-transparent metal layer 74 (see FIG. 10), and titanium dioxide and silicon dioxide as the high (layer 78) and low (layer 77) refractive index dielectric materials, respectively, are given in Table 1. The spectral performance of this structure over the spectral region of 300 to 1200 nm is shown in FIG. 12. The reflection for long wavelength infrared radiation is in excess of 90 percent (curve 86) and the visible transmission is in excess of 90 per cent (curve 88).

TABLE 1

| Layer # | Material Thickness (nm) | |
|---|---|---|
| | Air | Incidence Medium |
| 1 | TiO$_2$ | 32.6 |
| 2 | Silver | 20 |
| 3 | TiO$_2$ | 28.3 |
| 4 | SiO$_2$ | 110 |
| 5 | TiO$_2$ | 102 |
| | Glass | Substrate |

Figure 13:
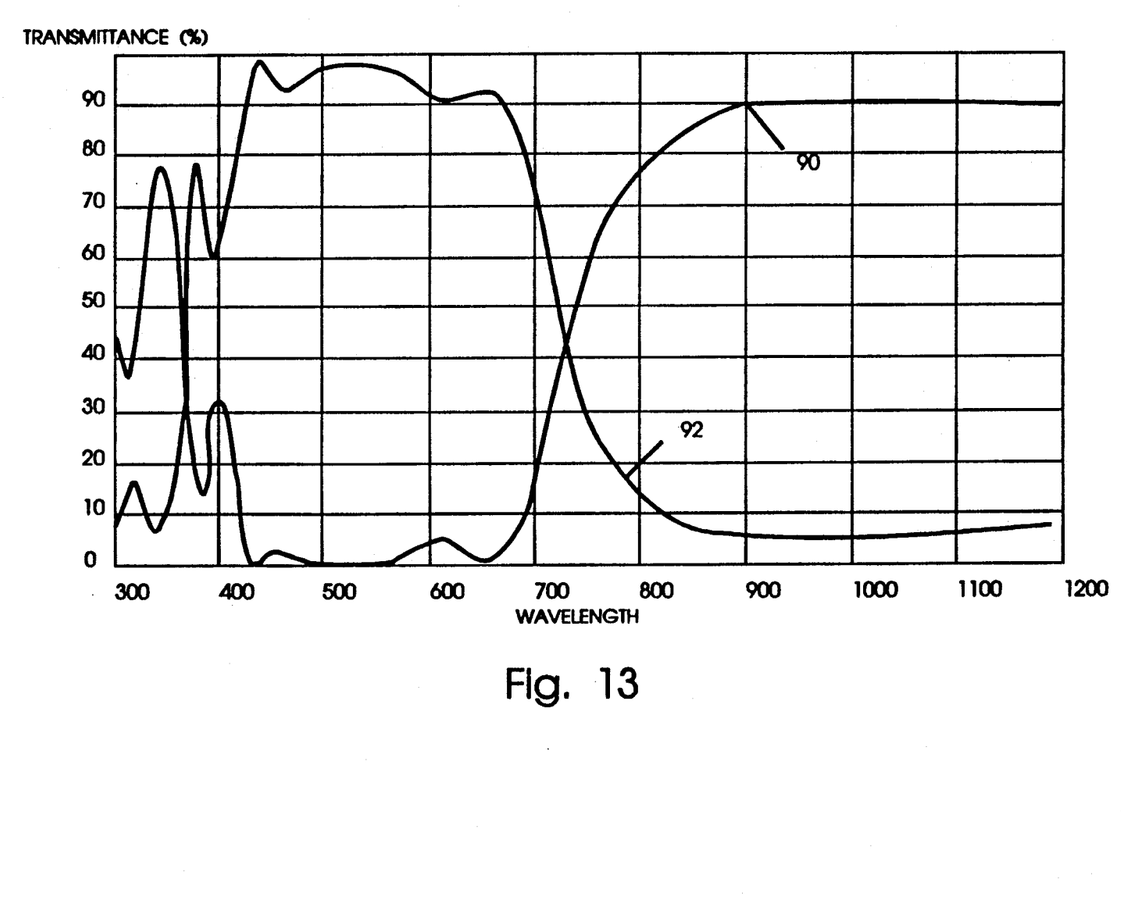
FIG. 13 is a graph illustrating the spectral performance of a seven layer structure of the present invention.

The specific layer thicknesses for seven layer structure 70 using silver (layer 74) as the partially transparent metal layer, and titanium dioxide and silicon dioxide as the high (layers 78, 84) and low (layers 77, 82) index dielectric materials are given in Table 2. The spectral performance of this structure over the 300 to 1200 nm region is shown in FIG. 13. The steeper transition (curve 92) from the visible transmission region to the NIR rejection region, compared with the five layer structure, is evident. The reflection for long wavelength infrared radiation is still in excess of 90 percent (curve 90). There is no difference in this property compared with the five layer structure as the long wavelength reflection value is determined entirely by the silver layer (layer 74) and the single dielectric overlayer (layer 72) which are essentially the same in both examples.

TABLE 2

| Layer # | Material Thickness (nm) | |
|---|---|---|
| | Air | Incidence Medium |
| 1 | TiO$_2$ | 31.6 |
| 2 | Silver | 19.3 |
| 3 | TiO$_2$ | 25.7 |
| 4 | SiO$_2$ | 108 |
| 5 | TiO$_2$ | 90 |
| 6 | SiO$_2$ | 151 |
| 7 | TiO$_2$ | 101 |
| | Glass | Substrate |

Other transparent metals, such as gold and copper can be used in the structure described above. Additionally, other high refractive index materials, for example, zinc sulphide, zinc oxide, tin oxide, and tantalum oxide, and low refractive index materials, such as magnesium fluoride and thorium flouride, could be used instead of titanium dioxide and silicon dioxide.

As discussed above, it is sometimes desirable to reduce visible transmission to minimize the transfer of solar heat load through a glazing. This may be accomplished by employing less transparent metals, such as tungsten, cobalt, or rhodium, in the structure. In general, however, these absorbing metals do not exhibit the rapid drop in transmissivity at longer wavelengths that is characteristic of silver, copper and gold.

Titanium nitride ha reflection characteristics similar to that of gold in that the reflection rises rapidly at wavelengths longer than 520 nm and transmission falls accordingly. In the form of a semi-transparent film, however, the transmission is approximately one-half that of gold with the same reflectivity at NIR wavelengths.

Nevertheless, for applications where visible transmission is not critical, and/or where extreme durability would be an advantageous, titanium nitride is an excellent substitute for gold.

The present invention may be effectively applied to improve the solar control properties of low E systems using titanium nitride. The following five layer system is offered as an example.

In this embodiment, the dielectric multilayer portion $(L/2\ H\ L/2)^n$ is located farthest from the substrate 24. This modifies the arrangement described previously to the form:

Air $(L/2\ H\ L/2)^n$ D M D Glass

Figure 14:
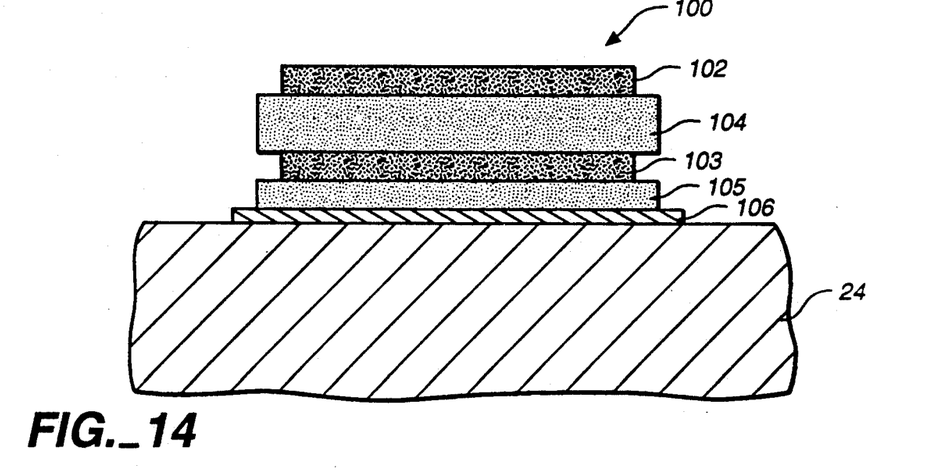
FIG. 14 schematically illustrates another embodiment of the present invention using titanium nitride.

As shown in FIG. 14 and in Table 3, low refractive index layers 102 and 103 of structure 100 may comprise silicon dioxide, while the high refractive index layers 104 and 105 may be titanium dioxide. The metal layer 106 is titanium nitride (TiN) having the optical constants set forth in a paper by Szczyrbowski et al., "Optical and Electrical Properties of Thin TIN-layers," *Vakuum Technik*, 37, 14–18 (1988).

TABLE 3

| Layer # | Material Thickness (nm) | |
|---|---|---|
| | Air | Incidence Medium |
| 1 | SiO$_2$ | 65.4 |
| 2 | TiO$_2$ | 95.3 |
| 3 | SiO$_2$ | 85.5 |
| 4 | TiO$_2$ | 30.5 |
| 5 | TiN | 20 |
| | Glass | Substrate |

Figure 15:
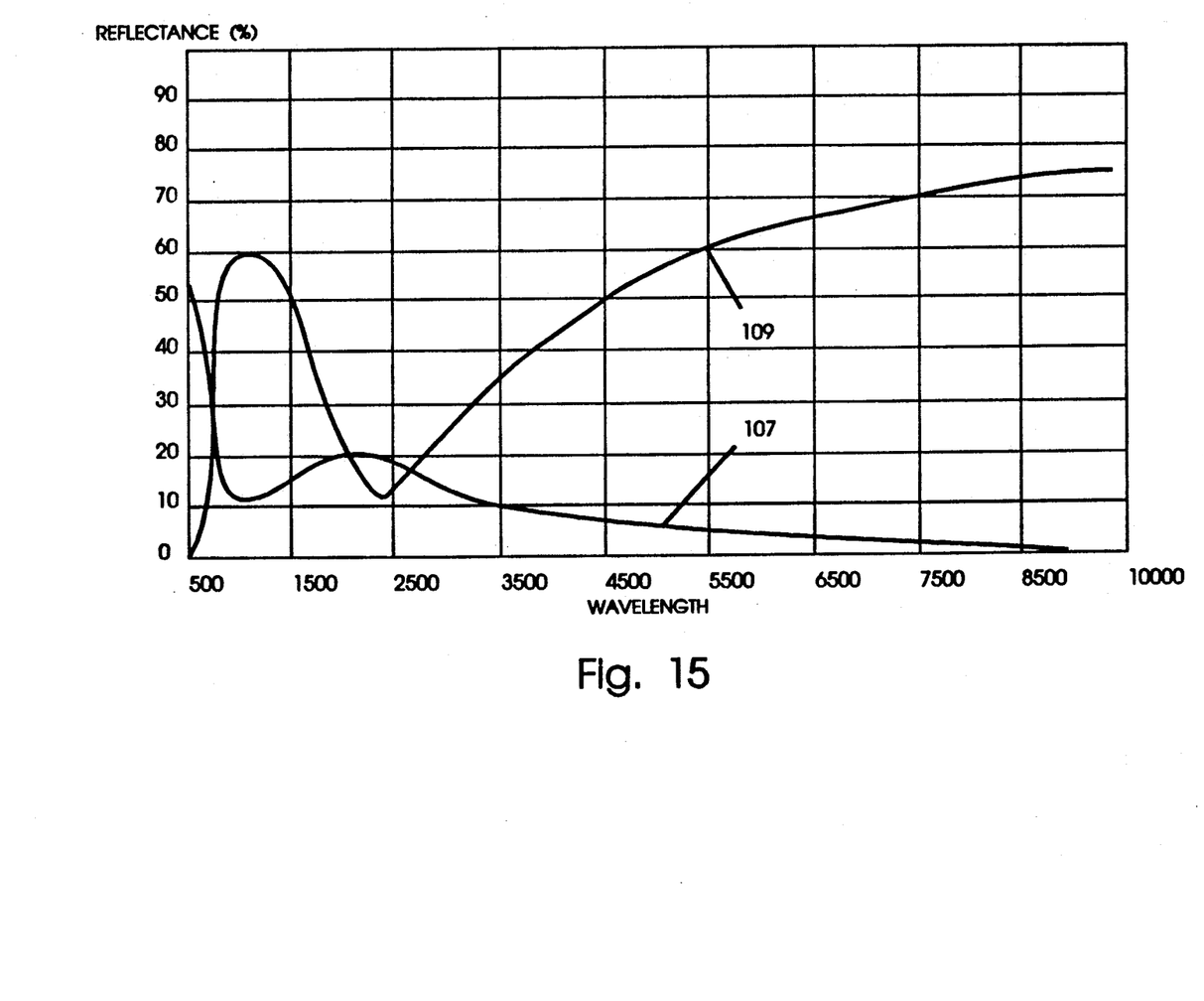
FIGS. 15 and 16 are graphs illustrating the spectral performance of the structure of FIG. 14.
Figure 16:
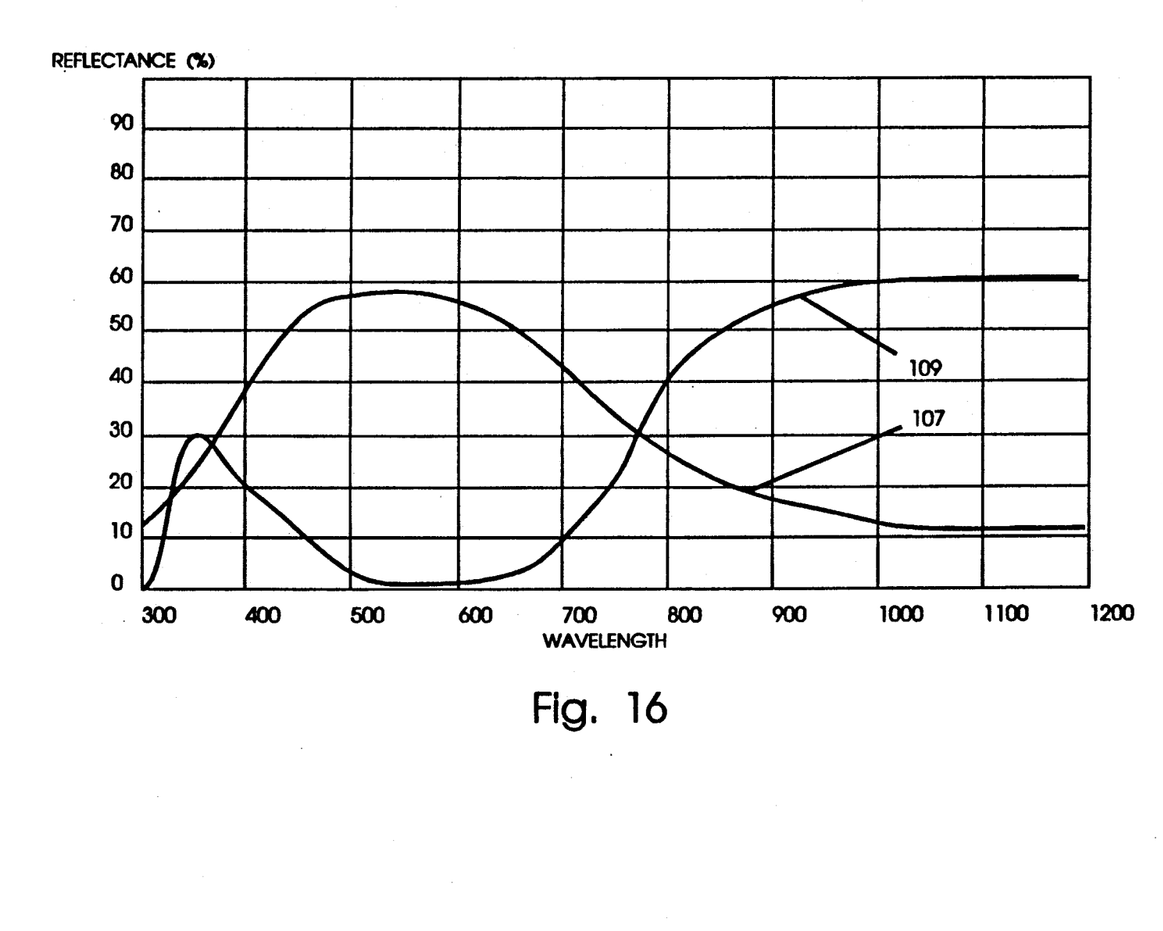

The computed spectral performance for structure 100 is shown in FIGS. 15 and 16. Curves 107 and 109 represent transmission and reflection, respectively, in both figures. As can be seen, the transmittance of structure 100 is about 50 percent for visible light and less than 10 percent for NIR radiation.

Structure 100 does not have as high a reflectivity as the silver-based structure described above. The reflectivity of structure 100 at longer wavelengths would be about 70 percent (curve 109). This results from the lower conductivity of the titanium nitride and also from the absorption of infrared radiation by the dielectric materials. It is anticipated that structures of this sort would be most useful where either physical durability of the coatings and/or reduction of solar heat load were more important than heat retention.

The embodiments described above illustrate the principles of the invention as well as provide an idea of the scope of its application. The properties have been computed as being observed from the air side of the structure, although those skilled in the art will know that the reflective properties of this type of device can be much different when observed from the substrate side of the device.

It is recognized that anyone familiar with the art might improve on the basic device by modifying the thickness of the films, the number of dielectric films, and the film materials to best satisfy a particular design goal. Such modifications, however, would still correspond with the basic concept of the present invention.

Any of the common vacuum deposition techniques could be used to deposit such structures, for example thermal evaporation, DC reactive sputtering of the metals or RF sputtering of the compounds directly, and chemical vapor deposition.

It is recognized that the choice of deposition technique and the component materials of the structure may necessitate the use of optically insignificant barrier or adhesion layers as described previously.

Although certain embodiments of the invention have been described herein in detail, the invention is not to be limited only to such embodiments, but rather only by the appended claims.

What is claimed is:

1. An interference coating on a transparent substrate, comprising a first film of a transparent material having a high refractive index and an optical thickness less than about one-quarter wavelength at a wavelength between about 450 and 650 nanometers; a transparent conductive second film having a thickness between about 7 and 25 nanometers; a third film of transparent material having a high refractive index and an optical thickness less than about one-quarter wavelength at a wavelength between about 450 to 650 nanometers; a fourth film having a low refractive index and an optical thickness of about one-eighth wavelength at a wavelength between about 800 and 1100 nanometers; a fifth film having a high refractive index and an optical thickness of about one-quarter wavelength at a wavelength between about 800 and 1100 nanometers; the refractive index of said first, third and fifth films between about 1.79 and 2.7 at a wavelength of about 520 nanometers, and the refractive index of said fourth film between about 1.35 and 1.79 at a wavelength of about 520 nanometers; and wherein said first, second, third, fourth, and fifth films are numbered sequentially beginning with the film farthest from the transparent substrate.

2. The coating of claim 1 further comprising a sixth film of low refractive index material having an optical thickness of about one-eight wavelength at a wavelength between about 800 and 100 nanometers.

3. The coating of claim 1 further including a sixth film of low refractive index material having an optical thickness of about one-quarter wavelength at a wavelength between about 800 and 1100 nanometers; and a seventh film of high refractive index material having an optical thickness of about one-quarter wavelength at a wavelength between abut 800 and 1100 nanometers.

4. The coating of claim 1 wherein said transparent conductive second film is made from titanium nitride.

5. The coating of claim 1 wherein said transparent conductive second film is made from a metal.

6. A multilayer, interference coating on a transparent substrate, comprising: a first film of a transparent, low refractive index material having an optical thickness of about one-eight wavelength at a wavelength between about 800 and 1100 nanometers; a second film of a transparent high refractive index material having an optical thickness of about one-quarter wavelength range between about 800 and 1100 nanometers; a third film of a low refractive index material having an optical thickness of about one-eighth wavelength optical thickness at wavelength between about 800 and 1100 nanometers; a fourth film of a high refractive index material having an optical thickness less than about one-quarter wavelength at a wavelength between about 450 and to 650 nanometers; a transparent conductive fifth film having an optical thickness between about 7 and 25 nanometers; said high refractive index between about 1.79 and 2.7 at a wavelength of about 520 nanometers, and said low refractive index between about 1.35 and 1.79 at a wavelength of about 520 nanometers; and wherein said first, second, third, fourth, and fifth films are numbered sequentially beginning with the film farthest from the transparent substrate.

7. The coating of claim 6 further comprising a sixth film of high refractive index material having an optical thickness less than about one-quarter wavelength at a wavelength between about 450 to 550 nanometers.

8. The coating of claim 6 wherein said transparent conductive fifth film is made from titanium nitride.

* * * * *

UNITED STATES PATENT AND TRADEMARK OFFICE
CERTIFICATE OF CORRECTION

PATENT NO. : 5,183,700

DATED : February 2, 1993

INVENTOR(S) : R. Russel Austin

It is certified that error appears in the above-identified patent and that said Letters Patent is hereby corrected as shown below:

In claim 3, column 8, line 58, delete "abut" and insert --about --.

In claim 6, column 9, line 4, delete "optical thickness".

In claim 6, column 9, line 5, insert --a-- between "at" and "wavelength".

Signed and Sealed this

Sixteenth Day of November, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,183,700
DATED : February 2, 1993
INVENTOR(S) : R. Russell Austin

It is certified that error appears in the above-indentified patent and that said Letters Patent is hereby corrected as shown below:

Claim 2, Column 8, line 51, replace "100" with --1100--.

Signed and Sealed this

Thirty-first Day of May, 1994

Attest:

BRUCE LEHMAN

Attesting Officer    Commissioner of Patents and Trademarks